Patented Feb. 11, 1941

2,231,021

UNITED STATES PATENT OFFICE 2,231,021

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application November 2, 1938, Serial No. 238,410

10 Claims. (Cl. 260—205)

This invention relates to the art of dyeing or coloring. More particularly, it relates to new aromatic azo dye compounds and the application of the nuclear non-sulfonated dye compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of aromatic azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention have the general formula:

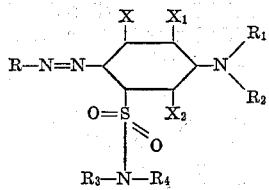

wherein R represents the residue of an aromatic nucleus, $R_1$, $R_2$, $R_3$ and $R_4$ each represents hydrogen, an alkyl group, (including substituted alkyl groups) a cycloalkyl group, an aryl group, an allyl group or a heterocyclic group and X, $X_1$ and $X_2$ each represents hydrogen or a suitable monovalent substituent such as chlorine, bromine, iodine, a nitro group, an alkyl group such as methyl, ethyl, propyl, hydroxyethyl, or β-methoxyethyl, an alkoxy group such as methoxy or ethoxy and a cyano group.

The azo dye compounds of our invention can be prepared by coupling an aromatic diazonium compound with a coupling compound having the general formula:

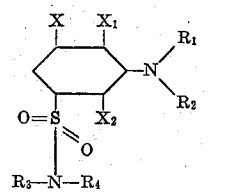

wherein $R_1$, $R_2$, $R_3$, $R_4$, X, $X_1$ and $X_2$ have the meaning previously assigned to them.

As previously indicated, the nuclear non-sulfonated aromatic azo dye compounds of our invention constitute valuable dyes for the coloration of organic derivatives of cellulose, such as those hereinbefore mentioned, yielding various shades thereon of good fastness to light and washing. These nuclear non-sulfonated dye compounds likewise possess application for the dyeing of wool and silk and yield generally similar shades on these materials as on organic derivatives of cellulose. Compounds in which the aromatic nucleus designated R contains a nuclear sulfonic acid group can likewise be prepared in known fashion. These compounds possess little or no utility for the coloration of organic derivatives of cellulose but can be employed to color textile materials such as wool and silk, yielding various shades thereon. For the dyeing of organic derivatives of cellulose such as cellulose acetate silk, nuclear non-sulfonated compounds wherein R is a phenyl residue are generally advantageous. Said phenyl nucleus may be substituted as clearly indicated herein.

The following examples illustrate the preparation of the azo dye compounds of our invention:

*Example 1*

13.8 gm. p-nitroaniline are suspended in 200 cc. of water containing 40 cc. hydrochloric acid and diazotized at 5–10° with 6.9 gm. sodium nitrite.

18.6 gm. m-methylaminobenzenesulfonamide are dissolved in cold dilute hydrochloric acid. Ice is added and the diazo solution prepared as described above is added with stirring. After standing a short time coupling is completed by adding sodium acetate and the dye is filtered, washed and dried. The dye colors cellulose acetate red from an aqueous suspension of the dye.

*Example 2*

17.3 gm. p-nitro-o-chloro aniline are diazotized as described in Example 1 and coupled with 20 gm. m-dimethylaminobenzenesulfonamide as described above. The dye colors cellulose acetate rubine from an aqueous suspension of the dye.

*Example 3*

21.6 gm. p-nitro-o-bromo aniline are diazotized as described in Example 1 and coupled with 24.6 gm. 4 - methoxy - 5 - β - hydroxyethylamino benzenesulfonamide as previously described. The dye colors cellulose acetate rubine from an aqueous suspension of the dye.

*Example 4*

15.6 gm. p-nitro-o-fluoroaniline are diazotized and coupled with 29 gm. 4-methoxy-5-di-β-hydroxyethylaminobenzenesulfonamide as previously described. The dye colors cellulose acetate rubine from an aqueous suspension of the dye.

*Example 5*

21.7 gm. p-nitro-o-bromoaniline are diazotized and coupled with 28.8 gm. 4-methoxy-5-ethyl-β-hydroxy-ethyl sulfonmethylamide as previously described. The dye colors cellulose acetate rubine from an aqueous suspension of the dye.

*Example 6*

16.8 gm. p-nitro-o-methoxyaniline are diazotized and coupled with 21.4 gm. m-glycerylaminobenzenesulfonamide as previously described. The dye colors cellulose acetate red from an aqueous suspension of the dye.

*Example 7*

13.5 gm. p-aminoacetophenone are dissolved in 150 cc. of water containing 25 cc. hydrochloric acid. Ice is added and the amine is diazotized with 6.9 gm. of sodium nitrite and coupled with 18.4 gm. of m-β-hydroxyethylaminobenzene sulfonamide as previously described. The dye colors cellulose acetate orange from an aqueous suspension of the dye.

*Example 8*

12.8 gm. o-chloroaniline are diazotized as described in Example 7. 47.9 gm.

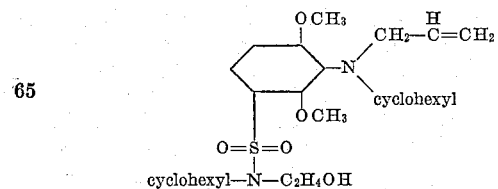

are dissolved in cold acetic acid and the diazo solution is added. Then sodium acetate is added until the mixture no longer turns Congo blue. The reaction mixture is allowed to stand in a cold place until coupling is complete. Then water is added and the dye is filtered, washed, and dried. The dye colors cellulose acetate yellow from an aqueous suspension of the dye.

*Example 9*

(A) 18.3 gm. 2,4-dinitroaniline are dissolved in hot acetic acid (220 cc.) and rapidly cooled to room temperature.
(B) 7 gm. sodium nitrite are added to 53 cc. sulfuric acid at 15–20°, warmed to 70° and then cooled to 10–15°.

While stirring (A), add (B) over a period of 45 min. maintaining a temperature of 10–15° and then stir at room temperature for one hour.

28.8 grams of m-di-β-hydroxyethylaminobenzene sulfonyl dimethyl amide are dissolved in cold dilute sulfuric acid. Ice is added and the diazo solution is added slowly with stirring. Coupling is completed by adding sodium acetate, the dye filtered, washed and dried. The dye colors cellulose acetate violet from an aqueous suspension of the dye.

*Example 10*

21.9 gm. 2,4-dinitro-6-chloroaniline are diazotized as described in Example 9 and coupled with the following:

27.2 gm. m-di-β-hydroxyethylaminobenzene-sulfon-β-hydroxyethylamide are dissolved in cold dilute hydrochloric acid and coupling is carried out as previously described. The dye colors cellulose acetate violet from an aqueous suspension of the dye.

*Example 11*

26.2 gm. 2,4-dinitro-6-bromoaniline are diazotized and coupled with 22.8 gm. 4-methoxy-5-glycerylaminobenzene sulfonamide as previously described. The dye colors cellulose acetate violet-blue from an aqueous suspension of the dye.

*Example 12*

20.8 gm. 2,4-dinitro-6-cyanoaniline are diazotized as previously described and coupled with 39 gm. 2 - chloro - 3 - methyl - 5 - sulfontetrahydrofurfuryl aminobenzene tetrahydrofurfuryl amide as previously described. The dye colors cellulose acetate violet from an aqueous suspension of the dye.

*Example 13*

The diazo compound of Example 12 is added to a dilute (iced) hydrochloric acid solution of 3,5-tetraethyldiamino benzene sulfonamide and coupling is carried out as previously described. The dye colors cellulose acetate violet from an aqueous suspension of the dye.

*Example 14*

23.3 gm. 2,4-dinitro-α-naphthylamine are diazotized as described previously and added to an iced dilute sulfuric acid solution of 27.2 gm. 2-hydroxy-5 - methylethyl amino benzene sulfon - methylethylamide and coupling is carried out as previously described. The dye colors cellulose acetate purple from an aqueous suspension of the dye.

*Example 15*

24.4 gm. dianisidine are diazotized in the usual manner and added slowly to a well iced aqueous solution of 65.8 gm. of

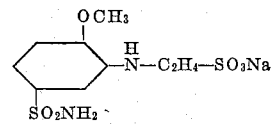

as previously described. When coupling is complete, the dye is salted out, filtered and dried. The dye colors cellulose acetate red from an aqueous solution of the dye which may contain salt.

*Example 16*

19.7 gm. p-aminoazo benzene are diazotized by suspending in 300 cc. of water with 40 cc. hydrochloric acid and treating with 6.9 gm. sodium nitrite at 20°.

The diazo solution thus prepared is added slowly to an aqueous (iced) solution of

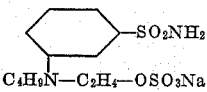

Concurrently with the addition of the diazo solution, there is added an aqueous solution of sodium carbonate at such a rate that the mixture is very slightly acid to Congo. When coupling is complete, the dye is salted out, filtered and dried. The dye colors cellulose acetate red from an aqueous solution of the dye which may contain salt.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds having the general formula: R—N=N—B wherein R represents the residue of a member selected from the group consisting of an aryl nucleus of the benzene series and an aryl nucleus of the naphthalene series, B represents an aryl nucleus of the benzene series containing a

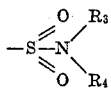

group and a

group in ortho and para position, respectively, to the azo bond and wherein $R_1$, $R_2$, $R_3$ and $R_4$ each represents a number selected from the group consisting of hydrogen, an alkyl group, a cycloalkyl group and a furyl group.

2. The azo dye compounds having the general formula: R—N=N—B wherein R represents the residue of an aryl nucleus of the benzene series, B represents an aryl nucleus of the benzene series containing a

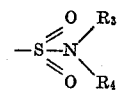

group and a

group in ortho and para position, respectively, to the azo bond and wherein $R_1$, $R_2$, $R_3$ and $R_4$ each represents a member selected from the group consisting of hydrogen, an alkyl group, a cycloalkyl group and a furyl group.

3. The azo dye compounds having the general formula: R—N=N—B wherein R represents the residue of an aryl nucleus of the benzene series and B represents an aryl nucleus of the benzene series containing a

group and a —NH$_2$ group in ortho and para position, respectively, to the azo bond.

4. The azo dye compounds having the general formula:

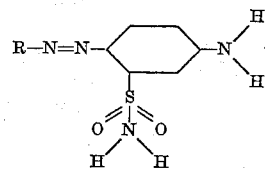

wherein R represents the residue of an aryl nucleus of the benzene series.

5. Material made of or containing an organic derivative of cellulose colored with a nuclear non-sulfonated azo dye compound having the general formula: R—N=N—B wherein R represents the residue of a member selected from the group consisting of an aryl nucleus of the benzene series and an aryl nucleus of the naphthalene series, B represents an aryl nucleus of the benzene series containing a

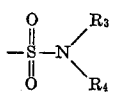

group and a

group in ortho and para position, respectively, to the azo bond and wherein $R_1$, $R_2$, $R_3$ and $R_4$ each represents a member selected from the group consisting of hydrogen, an alkyl group, a cycloalkyl group and a furyl group.

6. Material made of or containing an organic derivative of cellulose colored with a nuclear non-sulfonated azo dye compound having the general formula: R—N=N—B wherein R represents the residue of an aryl nucleus of the benzene series, B represents an aryl nucleus of the benzene series containing a

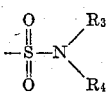

group and a

group in ortho and para position, respectively, to the azo bond and wherein $R_1$, $R_2$, $R_3$ and $R_4$ each represents a member selected from the group consisting of hydrogen, an alkyl group, a cycloalkyl group and a furyl group.

7. A cellulose acetate colored with a nuclear non-sulfonated azo dye compound having the general formula: $R-N=N-B$ wherein R represents the residue of a member selected from the group consisting of an aryl nucleus of the benzene series and an aryl nucleus of the naphthalene series, B represents an aryl nucleus of the benzene series containing a

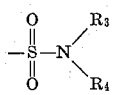

group and a

group in ortho and para position, respectively, to the azo bond and wherein $R_1$, $R_2$, $R_3$ and $R_4$ each represents a member selected from the group consisting of hydrogen, an alkyl group, a cycloalkyl group and a furyl group.

8. A cellulose acetate colored with a nuclear non-sulfonated azo dye compound having the general formula: $R-N=N-B$ wherein R represents the residue of an aryl nucleus of the benzene series, B represents an aryl nucleus of the benzene series containing a

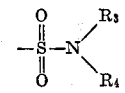

group and a

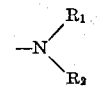

group in ortho and para position, respectively, to the azo bond and wherein $R_1$, $R_2$, $R_3$ and $R_4$ each represents a member selected from the group consisting of hydrogen, an alkyl group, a cycloalkyl group and a furyl group.

9. A cellulose acetate colored with a nuclear non-sulfonated azo dye compound having the general formula: $R-N=N-B$ wherein R represents the residue of an aryl nucleus of the benzene series and B represents an aryl nucleus of the benzene series containing a

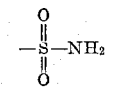

group and a $-NH_2$ group in ortho and para position, respectively, to the azo bond.

10. A cellulose acetate colored with a nuclear non-sulfonated azo dye compound having the general formula:

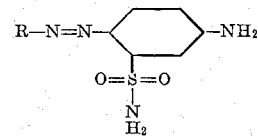

wherein R represents the residue of a phenyl nucleus.

JAMES G. McNALLY.
JOSEPH B. DICKEY.